June 10, 1958 — M. C. COHEN — 2,838,404
MEAT PACKAGE
Filed June 16, 1955 — 2 Sheets-Sheet 1
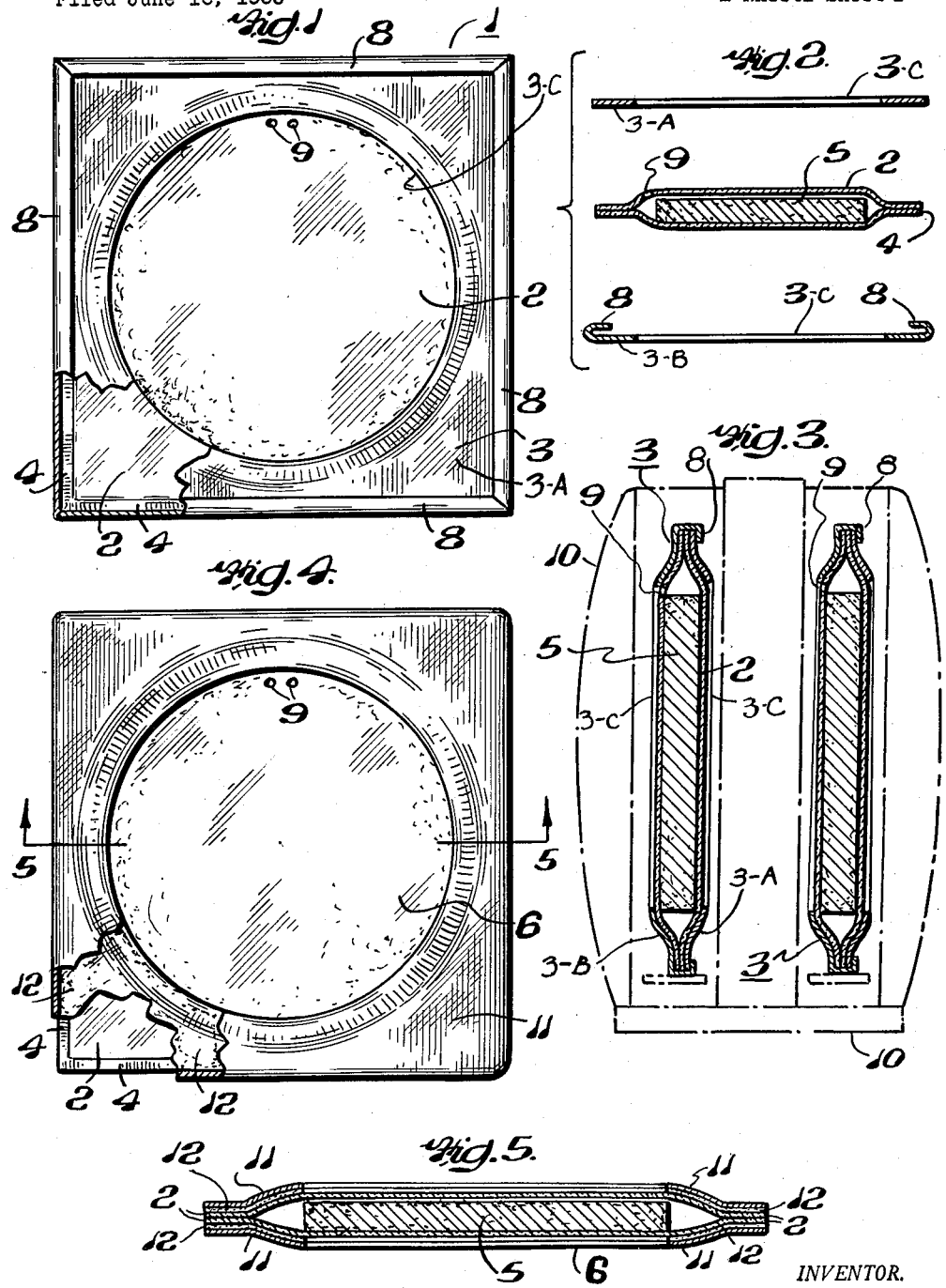
INVENTOR.
MARVIN C. COHEN
BY
HIS ATTORNEY June 10, 1958  M. C. COHEN  2,838,404
MEAT PACKAGE
Filed June 16, 1955  2 Sheets-Sheet 2

INVENTOR
MARVIN C. COHEN
BY
HIS ATTORNEY

# United States Patent Office 2,838,404
Patented June 10, 1958

2,838,404

MEAT PACKAGE

Marvin C. Cohen, Havertown, Pa.

Application June 16, 1955, Serial No. 515,931

2 Claims. (Cl. 99—174)

My invention is an improved food package which may be used as a container in cooking the contents thereof.

The primary object of my invention is to provide a food package in which the contents may be cooked and viewed without opening the package.

Another object of my invention is to provide a food package which may be inserted and cooked, unopened, in a domestic bread toaster.

Another object of my invention is to provide a food package in which the contents may be fully inspected prior to purchase without opening the package.

A still further object of my invention is to provide a food package in which the contents may be heated rapidly by radiant heat without opening the package.

The characteristic features and the principles of making and using my invention will further appear from the following description and the accompanying drawings in illustration thereof.

In the drawings—

Fig. 1 is a plan view of a food package embodying my invention;

Fig. 2 is an exploded view of the food package shown in Fig. 1;

Fig. 3 is an end cross-sectional, elevational view of a pair of food packages in cooking position in a conventional "pop-up" bread toaster shown in phantom;

Fig. 4 is a plan view of a modified food package embodying my invention;

Fig. 5 is a cross-sectional view of the modified food package shown in Fig. 4 taken along the line 5—5;

Figure 6:
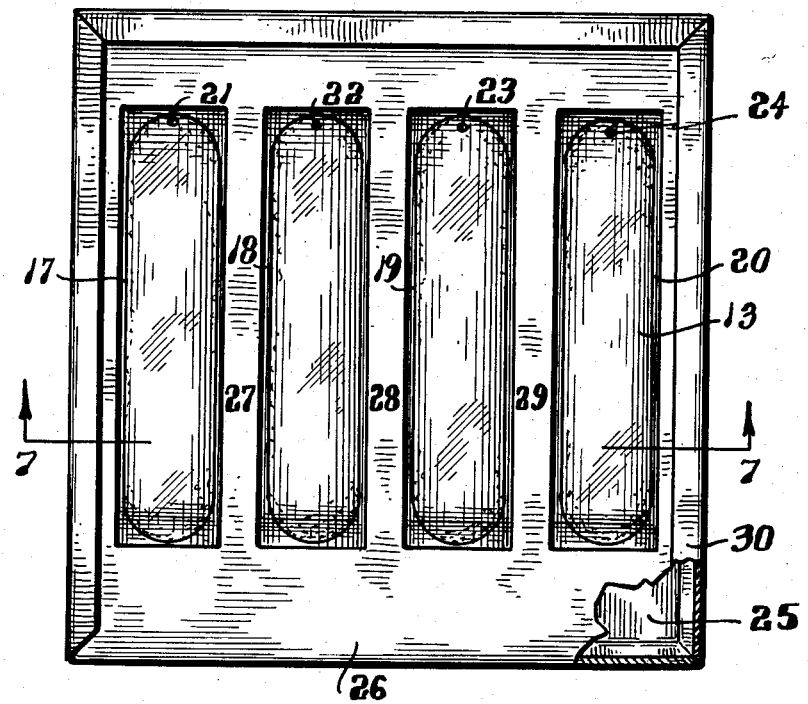
Fig. 6 is a plan view of my further modified food package.

My improved food package 1 comprises a transparent envelope 2 preferably made of a transparent film with a sealing coating such as clear polyethylene and cellophane bonded together or bonded Pliofilm or other clear material, and a centrally apertured opaque reflecting metal foil jacket 3 which encompasses the sealed edges 4 of the envelope 2 together with that portion of the envelope 2 not in direct or proximate contact with the food 5 enclosed within the envelope 2.

In preparing the packaged article, the food 5, such as a flat round raw hamburger patty, is placed in the somewhat oversize generally rectangular transparent film envelope 2 and the mouth of the envelope is heat-sealed. Thereupon the metal foil jacket 3 is placed around the sealed envelope 2. The jacket 3 may be formed of two separate rectangular metal foil sheets 3—A and 3—B, best shown in Fig. 2, each having a circular central opening or window 3—C corresponding generally in diameter to the hamburger patty 5. The sheet 3—A corresponds in size and shape to the sealed envelope 2, as shown in Fig. 2, while the sheet 3—B is somewhat larger so that its peripheral edges can be turned over to form four lips 8 which fit over the edges of the envelope 2 and the sheet 3—A and, upon being clamped tight, serve to hold the jacket 3 in place about the envelope 2. The uncovered portion of the transparent film envelope 2 is pierced with one or more small holes 9 adjacent to an edge of the metal foil 3 so as to permit the escape of steam and vapor while the food is being cooked, as will be hereafter explained. The food package in its final form has overall dimensions which approximate the dimensions of an ordinary slice of bread and thus it can be readily inserted in the conventional "pop-up" toaster 10 for cooking.

To cook, the normally frozen hamburger package is removed from the refrigerator or deep-freeze (not shown) and placed directly in the toaster 10. The timing device on the toaster can, of course, be adjusted to provide the amount of cooking time required. In placing the package in the toaster the edge containing the vent holes 9 must be located at the top to permit the escape of steam and vapor and to prevent the juice from dripping on the toaster. The radiant heat from the toaster coils easily and rapidly penetrates the transparent film of the envelope 2 in the areas left uncovered by the windows 3—C and quickly melts the fat in the meat and converts any water to steam. This combination of fat juice, vapor and steam protects the juxtaposed film of the envelope from scorching or burning. The opaque metal foil jacket 3 reflects the radiant heat from the periphery of the package so that those portions of the transparent film not in proximate contact with the food never get hot enough to scorch or burn. The foil jacket 3 also acts as a support and holds the package rigid thereby avoiding direct contact between the heating coils of the toaster and the transparent film envelope 2. As the envelope is preferably made from clear transparent film, the contents can be readily viewed to determine whether or not the hamburger is adequately cooked.

As soon as the hamburger has been cooked, the package is removed from the toaster and opened and the hamburger is ready to be eaten. The package can then be discarded, thus eliminating the need for washing of dirty pans and dishes.

In the modified package illustrated in Figs. 4 and 5, I use an envelope 6 which has its edges and the areas which will not come in proximate contact with the food to be packaged coated with a reflecting film or deposit 11 of metal such as aluminum or silver. In order to provide rigidity to the package the sealed transparent film envelope 2 is preferably backed up with a centrally apertured rectangular heavy paper or light cardboard jacket 12 bonded to the envelope 2 and the metal film 11. The cooking procedure used with this modified package is identical to that used with my original package. The film 11 of aluminum or silver provides uncoated central windows for the food and also provides peripheral heat reflective surfaces to prevent the radiant heat from striking that portion of the film envelope 2 which is not in the proximate vicinity of the hamburger and which would otherwise be scorched or burned.

Figure 7:
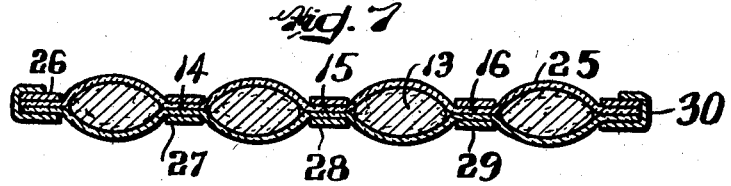
Fig. 7 is a cross-sectional view of the modified food package shown in Fig. 6 taken along the line 7—7.
Figure 8:
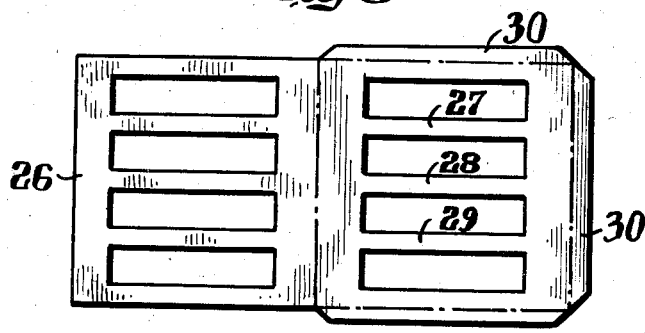
Fig. 8 is a plan view of the protective foil, in open position, used in my modified food package.

In the further modification of my package, illustrated in Figs. 6, 7 and 8, I provide a ready means for packaging and cooking sausages, hot dogs and the like. In such modified package, each piece of sausage 13 is separated from the other pieces by sealing the envelope 25 together to form partitions 14, 15 and 16 and compartments 17, 18, 19 and 20. The compartments 17, 18, 19 and 20 are vented by individual apertures 21, 22, 23 and 24 to permit the escape of steam and vapor as heretofore. The compartmented envelope 25 is then enclosed in a heat reflecting metal jacket 26 which may be formed in one piece, as shown in Fig. 8. The jacket 26 protects those portions of the envelope 25 not in proximate contact with the food. The partitions 14, 15 and 16 are shielded from the radiant heat by the vertical members 27, 28 and 29 of the jacket 26. Like my original package, the edges 30 of the jacket are bent over to securely hold the envelope 25 and jacket 26 together. In place of the jacket 26, I may metal coat and reenforce the envelope 25 in a manner similar to that employed with envelope 6, illustrated in Figs. 4 and 5.

It is to be understood that, while I have referred to the packaging of hamburger and sausage, my food package may be used with equal facility in connection with any food where a juice, steam or vapor is generated either from the food itself or by adding a vapor forming additive to the package to protect the envelope exposed to the direct heating rays. In each instance the heat reflective metal foil jacket or film of deposited metal shields that part of the transparent film envelope which is not protected by the vapor from the radiant heat. It is to be understood also that my food package may also be used in a broiler or any place where the radiant heat from the fire or heating element can rapidly penetrate the transparent envelope. As the food is completely contained until ready for eating, it is never touched or contaminated by the hands or otherwise though it is always visually examinable.

Having described my invention, I claim:

1. A heatable meat package comprising meat inside an edge sealed envelope of transparent plastic material capable of transmitting radiant heat; said envelope being oversized for the quantity of meat disposed therein and having its sealed edge spaced apart from the meat and a heat reflective jacket around said envelope at the sealed edge thereof, the heat reflective jacket covering only a portion of said envelope leaving exposed to view a window approximating in size and shape the meat contained in said envelope, vent openings being provided in said envelope to allow escape of vapors released during heating, whereby the meat can be exposed to radiant heat for heating the same, while the vapors released during the heating protect the window against overheating and the heat reflective jacket protects those portions of the envelope not in direct contact with the meat against radiant heat.

2. The package of claim 1 wherein the heat reflective jacket is relatively rigid, enabling the package to stand on edge during the heating thereof.

References Cited in the file of this patent

UNITED STATES PATENTS

| 2,598,373 | Harry | May 27, 1952 |
| 2,609,301 | Lindsey | Sept. 2, 1952 |

OTHER REFERENCES

"Refrigerating Engineering," February 1954, page 46, article entitled Packaging and Wrapping Materials.